(12) United States Patent
Messerly et al.

(10) Patent No.: US 6,438,628 B1
(45) Date of Patent: Aug. 20, 2002

(54) SYSTEM AND METHOD FOR DATA PACING

(75) Inventors: Shayne Messerly, Farmington; Harrison Killian, Kaysville; David Arnesen, West Jordan, all of UT (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/322,952

(22) Filed: May 28, 1999

(51) Int. Cl.[7] ............................................. G06F 13/00

(52) U.S. Cl. .............................. 710/35; 710/8; 710/59; 710/262

(58) Field of Search ............................... 710/8, 14, 15, 710/36, 48, 58–61, 261, 263, 9, 1, 20, 31, 33, 34, 35, 52, 49, 262

(56) References Cited

U.S. PATENT DOCUMENTS

| | | | | | |
|---|---|---|---|---|---|
| 4,275,440 | A | * | 6/1981 | Adams, Jr. et al. | 364/200 |
| 4,912,632 | A | * | 3/1990 | Gach et al. | 364/200 |
| 5,293,621 | A | * | 3/1994 | White et al. | 713/1 |
| 5,440,619 | A | * | 8/1995 | Cann | 379/97 |
| 5,561,780 | A | * | 10/1996 | Glew et al. | 711/126 |
| 5,634,139 | A | * | 5/1997 | Takita | 710/36 |
| 5,896,291 | A | * | 4/1999 | Hewitt et al. | 700/94 |
| 6,377,572 | B1 | * | 4/2002 | Dolan et al. | 370/355 |

* cited by examiner

Primary Examiner—Jeffrey Gaffin
Assistant Examiner—Rijue Mai
(74) Attorney, Agent, or Firm—Michaelson & Wallace; Peter L. Michaelson; Janet M. Skafar

(57) ABSTRACT

The present invention increases data transfer rate and reduces interrupt latency while avoiding a concomitant increase in interrupts to the host, by pacing the data flow between the UART and DSP using burst modes and wait modes.

16 Claims, 5 Drawing Sheets

SYSTEM AND METHOD FOR DATA PACING

BACKGROUND OF THE INVENTION

Field of the Invention

The present invention relates in general to the transfer of data between a DSP in a modem and a host computer, and more particularly to a system and a method for pacing such transfer of data using a burst mode and a wait mode, to achieve optimal modem performance without impairing the overall operation of the host computer.

Data communication devices such as modems are important and ubiquitous devices that transmit and receive data. Data may include, for example, text, sound, images and video. In general, a modem operates by converting a digital data stream into a modulated analog signal for transmission over an analog telephone line. Because traditional analog telephone lines are designed to transmit analog information (such as voice), the modem ensures that the modulated analog signal conforms to the voice-like signal requirements of the analog telephone line. The modulation of digital data into an analog signal is typically done by a digital signal processor (DSP). The DSP also performs demodulation in which digital data is extracted from analog signals received over the telephone line. The DSP may also handle other tasks such as error detection and correction. In some cases, these other tasks can be performed by another device such as a microprocessor. Along with connecting to the telephone line, conventional modems also connect to a host computer, for example a personal computer (PC). Some type of hardware is required make this connection between the modem and the PC.

Modems can be divided into two categories based on how they are connected to a host computer, namely external modems and internal modems. In the most basic terms, this refers to whether or not the modem resides physically inside the host computer enclosure. External modems typically have their own enclosure and are connected to the host computer by a cable. At each end of this cable, there is usually a device called a universal asynchronous receiver-transmitter (UART). One UART is built into the host computer and a second UART is built in the modem. The first UART accepts information in a parallel format from the central processing unit (CPU) in the host computer. The UART rearranges this data into a serial format and transmits it across the cable to the modem. The UART in the modem converts the data back into a parallel format. The DSP (or other microprocessor) in the modem receives this data out of the UART and eventually the DSP modulates the data for transmission over the telephone line. Alternatively, data received from the telephone line is demodulated and sent to host computer in a similar manner using the same UARTs and cable.

Modems also can take the form of an add-in card that is installed in an expansion slot on the host computer. These can be classified as internal modems since they reside in the enclosure of the host computer. In this implementation, the modems typically connect directly to a parallel bus on the computer system. Using this parallel bus the CPU can transfer data to and from the modem without the need for rearranging the data into a serial format as is done with an external modem. Although the serialization is not required, many internal modems still include UART hardware without the serial elements. This hardware essentially replaces both UARTs and the cable used with an external modem as just described. As will be explained, this UART hardware is included so that internal type modems can be compatible with software written for use with an external modem.

A major factor in the design of personal computer systems is compatibility. Generally, new software should work with files created by older revisions of that software, new programs should work with existing hardware, and new hardware may have to work with existing software. Software running on the PC directs the modem operation and handles data movement in both directions. The first types of modems to become popular were external modems that employed a serial cable and a UART arrangement. Software that supported this hardware arrangement also became popular. Internal modems, which were subsequently developed, provided a UART interface to be compatible with the software that was written for external modems.

One important measure of modem performance is data transfer rate. The data transfer rate, also known as throughput, is the speed at which data can be transferred between devices. Data transfer rates are usually measured in kilobits (one thousand bits) or megabits (on million bits) per second. A higher data transfer rate means that more information can be transferred in a shorter period of time. A higher data transfer rate is desirable because network traffic, telephone toll changes, network access charges and download times are reduced.

Historically, data transfer rate was limited by the speed of the modulation techniques to send data over the analog telephone line. However, since modulation techniques have improved, the end-to-end speed of a modem connection is sometimes limited by the connection between the PC and the modem. For external modem UART hardware, the associated serialization of data causes this limitation. The inherent nature of this serialization paces the data so that data flows at a constant rate between the host computer and the modem. In the case of an internal modem, serialization is not necessary and UART hardware on these modems can support a much higher data rate. Unfortunately, the software that runs on the host or CPU expects to operate with a UART with serialization and the resultant data pacing. If data is allowed to flow through the UART without any type of pacing, the performance of the host computer can be adversely affected.

These performance problems can be understood by investigating in greater detail the operation of the host computer. Typically, the host computer includes software for communication over the modem. This software includes a special piece of code that is responsible buffering data and moving it in and out of the modem via the UART. One example of this type of code is an interrupt service routine (ISR.) In this case, the PC's CPU might be running a variety of tasks, when an interrupt signal is received by the modem. This interrupt indicates that a certain number of bytes of data have been received over the serial interface and stored in the UART. In response to this interrupt, the CPU suspends its main tasks and starts the ISR code. The ISR code reads bytes from the UART until it is empty and then the CPU goes back to its main tasks. The ISR routine itself is relatively simple and short, but the CPU uses many extra instructions and time suspending and restarting its main task. This extra time is referred to as interrupt overhead.

In the case of a UART interface without serialization, it is possible that the DSP on the modem might be sending data to the DSP side of the UART as fast and the Host CPU can read them out. Despite the fact that the modem can only receive data from the telephone line at a limited rate, a large amount of data could be transmitted from the DSP to the host for each interrupt. This is possible because the DSP typically implements a large buffer in its memory and the entire buffer could be emptied at once. While this data is being moved, other tasks (including interrupts from other devices) are blocked. If other tasks are block for too long, the performance of the host computer is severely impacted. For instance, the movement of the mouse cursor across the monitor screen is noticeably slowed when the modem interrupt monopolizes the CPU on the host computer.

Notwithstanding the foregoing, it is possible it to achieve a high data transfer rate on an internal modem because there is no need to serialize the data. It is possible to increase the data transfer rate between a modem and a host computer by techniques not employing a UART, such as direct memory access or high speed serial connections. These approaches can increase data throughput and reduce the interrupt overhead. These approaches also require that compatibility to existing software be sacrificed.

Thus, there exists a need for a system and method of transferring data between a host computer and a modem that has an increased data transfer rate without seriously impairing (and perhaps improving) the performance of the host computer while remaining compatible with existing software.

SUMMARY OF THE INVENTION

The present invention increases data transfer rate and reduces interrupt latency while avoiding a concomitant increase in interrupts to the host by pacing the data flow between the UART and DSP using burst modes and wait modes. In order to pace the data transfer rate between the UART and DSP, a UART-to-DSP Interface (hereinafter "UDIF") controls the flow of data between the UART and the DSP by alternatively bursting and halting data transfers.

During the burst mode, data is transferred across the interface at the maximum speed of the DSP (a "burst") until the number of characters transferred reaches a predetermined burst count. During the wait mode, data transfer is suspended for the duration of a wait count. Data pacing control for the receive operation and for the transfer operation is independent.

The UDIF has at least one transmit channel and one receive channel and a plurality of registers for the implementation of the parallel to parallel UART to DSP mode. The registers contain information defining the number of character transfers of the burst mode and the duration of the wait mode.

These registers may be loaded by the DSP. Optimal wait and burst times for efficient data pacing may be selected. For example, a typical data rate used on modems such as 115.2 kilobits per second can be achieved by programming the registers. Optionally, the registers can be reprogrammed to double or quadruple that data rate without significant impact to the performance or the cost of the computer.

BRIEF DESCRIPTION OF THE DRAWINGS

The present invention can be further understood by reference to the following description and attached drawings that illustrate the preferred embodiment.

DETAILED DESCRIPTION OF THE PREFERRED EMBODIMENTS

In the following description of the invention, reference is made to the accompanying drawings, which form a part thereof, and in which is shown by way of illustration specific examples whereby the invention may be practiced. It is to be understood that other embodiments may be utilized and structural changes may be made without departing from the scope of the invention.

The present invention seeks to overcome the limitations in a UART operating in a parallel-to-parallel mode with a DSP, by utilizing data pacing to increase the data transfer rate and reduce interrupt latency at the host without increasing the frequency of interrupts to the host. The data pacing features of the invention guaranty periods of inactivity in which the host can perform other tasks.

The present invention uses a data pacing protocol in the UDIF, the interface between the DSP and the UART. The data pacing protocol of the invention employs "burst" and "wait" modes on the DSP side of the UDIF to control when data is transferred.

In data "burst" mode, data is moved across the UDIF interface into UART buffers as fast as possible either in a transmit channel or a receive channel. In the transmit channel the data is moved from UART buffers to UDIF buffers, while in the receive channel data moves from the UDIF to the UART. The burst mode in either channel continues until the number of characters transferred across the interface reaches a predetermined character count. In "wait" mode, data movement between the UDIF buffers and the UART buffers is suspended for a predetermined duration. Consequently, no new interrupts are asserted to the host. This allows a period of time when the host is able to service other interrupts that are not associated with the modem.

A system programmer may exploit the versatility of the invention. A desired data transfer rate, for instance a rate commonly used on a serial UART connection, can be achieved by adjusting the amount of data sent in burst mode (i.e., the burst mode's character count) and the corresponding duration of the wait mode. The data transfer rate can be improved by increasing the data sent in each burst and keeping the wait period constant. This has marginal impact on the host computer since there is optimally only one interrupt for each burst period. By affording this data pacing versatility, the system can be streamlined to provide efficient throughput with guaranteed periods of inactivity while asserting a minimal number of interrupts to the host, thus allowing the host computer to service other system devices without being unduly burdened by the modem.

Structural Overview

Figure 1:
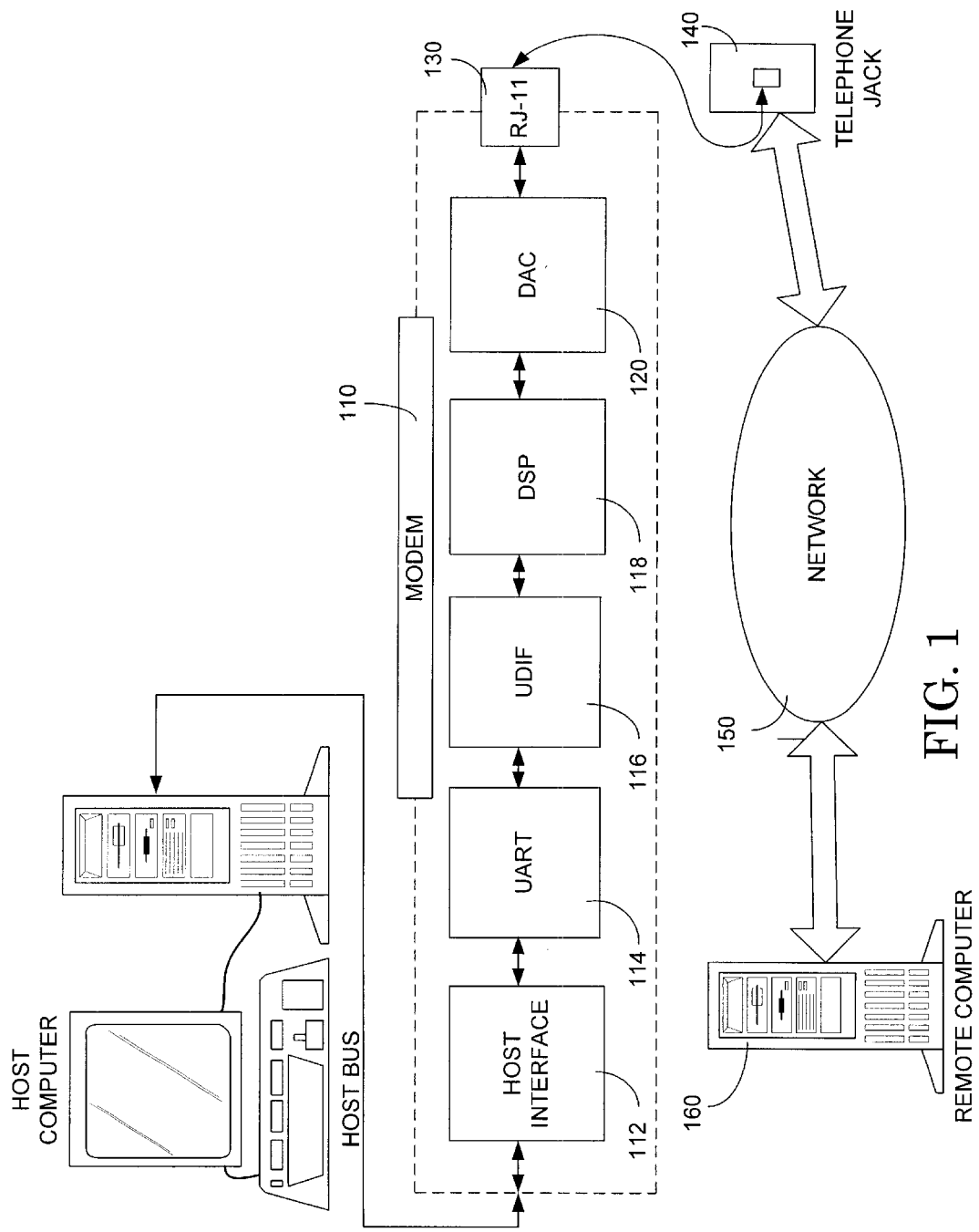
FIG. 1 is a block diagram illustrating a system incorporating the present invention.

FIG. 1 shows a block diagram illustrating a system incorporating the present invention. The system includes a host computer 100 connected to a modem 110 by means of connection well known in the art, including by way of example and not by way of limitation, ISA, EISA, PCI, AGP, SCSI and PCMCIA. The modem 110 is connected by conventional means, such as through an RJ-11 jack 130 and a telephone cable, to a typical telephone jack 140. The telephone jack 140 is connected to a network 150, a part of which is connected to a remote computer 160, thus allowing for communication between the host computer 100 and the remote computer 160.

Modem

The modem 110 includes a host interface 112 which communicates directly with the host computer 100. The host interface 112 is connected to a UART 114 for the receipt of data from, and transfer of data to, the host computer 100. The UART 114, which will be described in greater detail below, is connected to the UDIF 116, and serves as the interface between the UART 114 and the DSP 118. The DSP 118 receives and transmits signals from/to a digital/analog converter ("DAC") 120, which in turn receives and transmits signals from/to the RJ-11 connection 130.

UART and UDIF

Figure 2A:
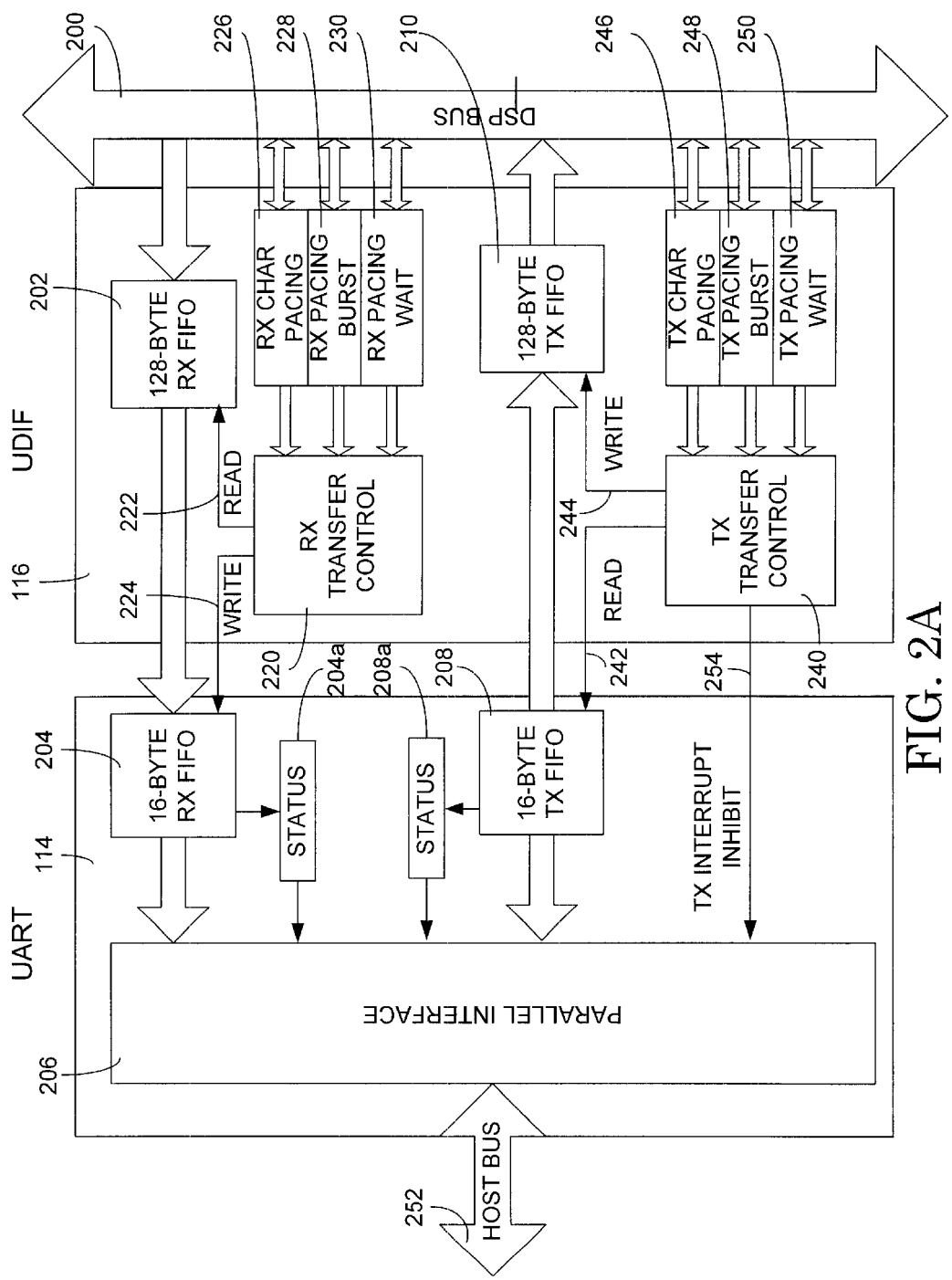
FIG. 2A illustrates a UDIF in the system of FIG. 1 in accordance with one embodiment.

Referring to FIG. 2A, in a preferred embodiment, the receive channel includes a DSP bus 200, connected to a UDIF receive buffer 202 (hereinafter "UDIF Rx Buffer"), the UDIF Rx Buffer 202 being connected to a UART Receive buffer 204 (hereinafter "UART Rx Buffer"), which is in turn connected to a UART parallel interface 206. The transmit channel includes the UART parallel interface 206, connected to a UART Transmit buffer 208 (hereinafter "UART Tx Buffer"), which is connected to a UDIF Transmit buffer 210 (hereinafter "UDIF Tx Buffer"), which is in turn linked to the DSP bus 200.

A Receive Transfer Controller 220 (hereinafter "Rx Transfer Controller") outputs a read signal 222 to the UDIF Rx Buffer 202, and a write signal 224 to the UART Rx Buffer 204. The Rx Transfer Controller 220 paces the receive data in accordance with the contents of three registers, namely a Receive Character Pacing Count Register 226 (hereinafter "Rx Character Pacing Count Register"), a Receive Pacing Burst Count Register 228 (hereinafter "Rx Pacing Burst Count Register"), and a Receive Pacing Wait Count Register 230 (hereinafter "Rx Pacing Wait Count Register"). These registers are preferably loaded by the DSP 118 via the DSP bus 200.

A Transmit Transfer Controller 240 (hereinafter "Tx Transfer Controller") outputs a read signal 242 to the UART Tx Buffer 208, and a write signal 244 to the UDIF Tx Buffer 210. The Controller 240 paces the transmit data in accordance with the contents of three registers, namely a Transmit Character Pacing Count Register 246 (hereinafter "Tx Character Pacing Count Register"), a Transmit Pacing Burst Count Register 248 (hereinafter "Tx Pacing Burst Count Register"), and a Transmit Pacing Wait Count Register 250 (hereinafter "Tx Pacing Wait Count Register"). These registers are preferably loaded by the DSP 118 via the DSP bus 200.

It should be noted that the various buffers 202, 204, 208 and 210 are buffers well known in the art. The memory and word size of these buffers depend upon design considerations, and the input/output queuing format may be of a type well known in the art such as FIFO, FILO, LIFO or LILO.

Figure 2B:
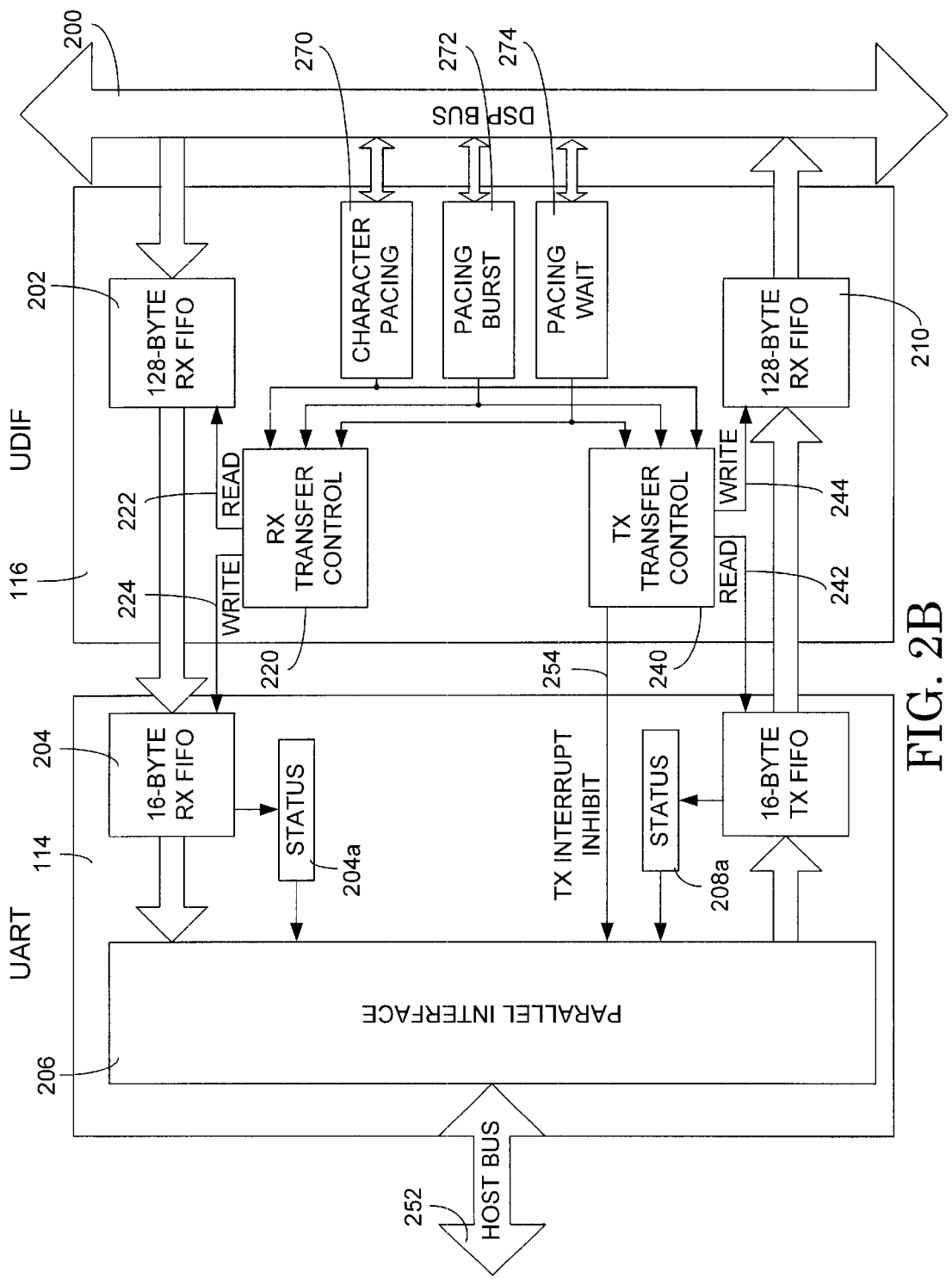
FIG. 2B illustrates a UDIF in the system of FIG. 1 in accordance with another embodiment.

In a preferred embodiment, the Rx Character Pacing Count Register 226 and the Tx Character Pacing Count Register 246 contain the same value, the Rx Pacing Burst Count Register 228 and the Tx Pacing Burst Count Register 248 contain the same value, and the Rx Pacing Wait Count Register 230 and the Tx Pacing Wait Count Register 250 contain the same value. Thus the three registers 226, 228 and 230 associated with the Rx Transfer Controller 220 and the three registers 246, 248 and 250 associated with the Tx Transfer Controller 240 can be structurally implemented as a single set of registers, namely a Character Pacing Count Register 270, a Pacing Burst Count Register 272 and a Pacing Wait Count Register 274, as shown in FIG. 2B.

Referring again to FIG. 2A, the Pacing Wait Count Registers 230, 250 store data which sets the wait count for pacing in the receive and transmit channels, respectively. This count determines the number of character times that the UDIF and/or UART will wait during wait mode. One character time is the time required to transmit a single character of data. During wait mode, the character count is the number of elapsed character times.

The Pacing Burst Count Registers, 228, 248 store data which sets the burst count in both the receive and transmit operations. This count is the number of characters transferred during one burst mode from the UART to UDIF or vice versa.

The duration in DSP clock counts of one character time is stored in each character pacing count register 226, 246. This information permits each controller 220, 240 to count character times during wait mode using the DSP clock. Thus, for example, the duration in DSP clock cycles of the wait mode in the receive channel is the product of the contents of the registers 226 and 230.

Functional Overview

1. Transmit Channel

Figure 3:
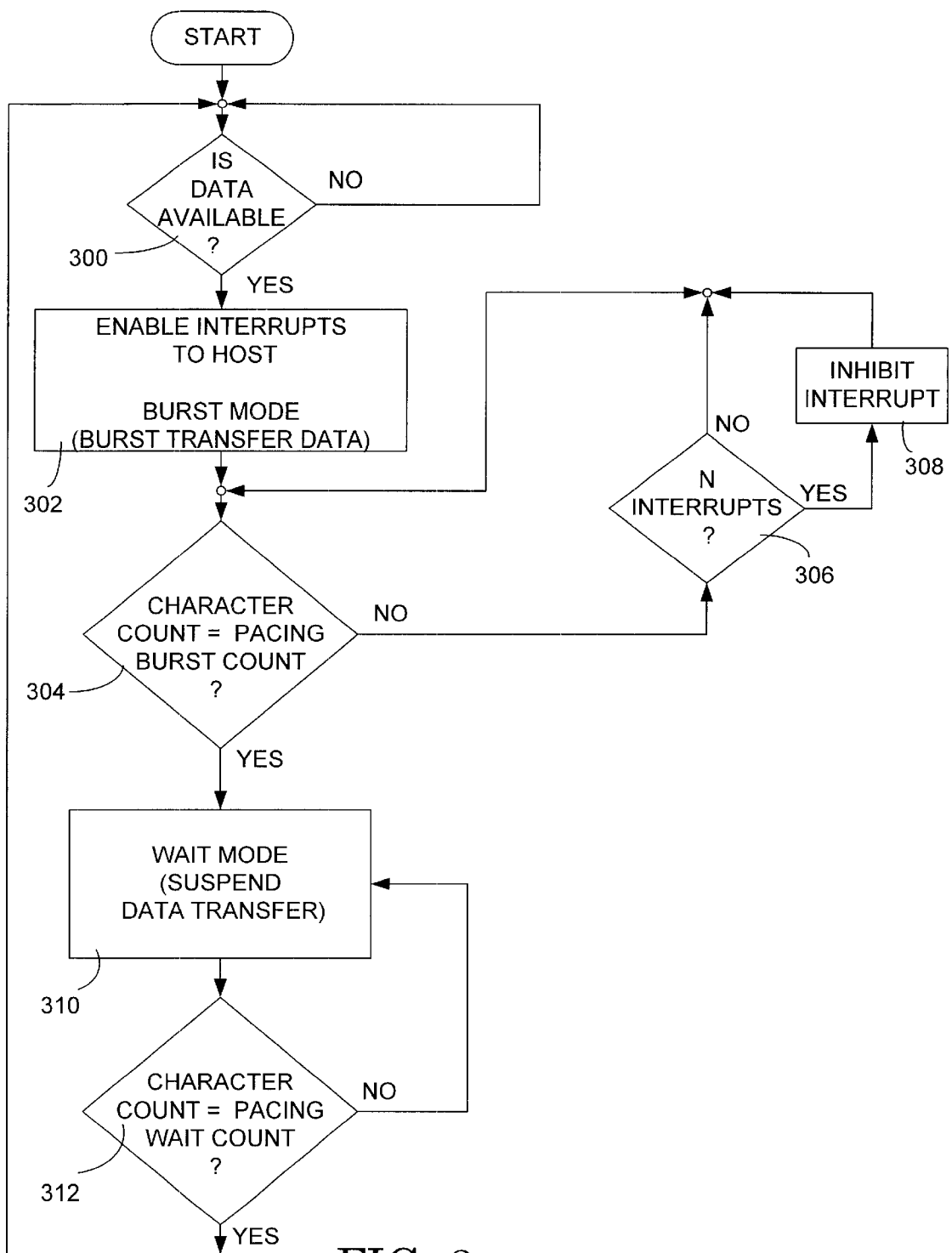
FIG. 3 is a functional diagram illustrating the operation of a transmit channel of the present invention.

FIG. 3 shows a process implemented by the Tx Transfer Controller 240 for the implementation of data pacing in the transmit channel. The design of the Tx Transfer Controller 240 is achieved using conventional logic design techniques well known in the art, so as to enable the controller to carry out the process of FIG. 3.

The parallel interface 206 receives data from the host computer via the host bus 252. In Block 300 of FIG. 3, the Tx Transfer Controller 240 determines if there is data available in the UART Tx Buffer 208. If there is no data available, the Tx Transfer Controller 240 continues to wait for data (NO branch of Block 300). If there is data available (YES branch of Block 300), the transmit channel of the UDIF enters burst mode.

In burst mode, the Tx Transfer Controller 240 enables interrupts to the host by disabling the Tx Interrupt Inhibit signal 254, asserts a read signal 242 to the UART Tx Buffer 208 and a write signal 244 to the UDIF Tx Buffer 210, and begins a character count (Block 302) by counting the number of data characters actually transferred across the interface. The UDIF Tx Buffer 210 is written with data read from the UART Tx Buffer 208, while the Tx Transfer Controller 240 keeps track of the total number of characters transferred across the interface in burst mode, in units of character counts (Block 302).

In Block 304, the Tx Transfer Controller 240 senses when the total number of characters transferred reaches the value stored in the pacing burst count register 248. If the character count has not yet reached this value (NO branch of Block 304), the UDIF continues data transfer from the UART Tx Buffer 208 to the UDIF Tx Buffer 210 (Block 302).

Following the NO branch of Block 304, in Block 306 the Tx Transfer Controller 240 determines whether there have been N interrupts asserted to the host requesting additional data. In a preferred embodiment, N=1. An interrupt is asserted whenever the UART Tx buffer 208 becomes empty. If N interrupts have been asserted (YES branch of Block 306), the Tx Transfer Controller 240 inhibits further interrupts to the host by enabling the Tx Interrupt Inhibit signal 254 (Block 308). Otherwise (NO branch of Block 306), interrupts are not inhibited.

The UART Tx buffer 208 is of the conventional type which has associated with it an external register 208a containing a status field which indicates whether the buffer 208 is empty. The external register 208a is accessed by the host via the host bus 252. Typically, the host computer is programmed in the conventional manner to monitor the status field of the register 208a and to re-fill the buffer 208 whenever the status field indicates the buffer is empty. As a result, the host refills the buffer 208 many times for each assertion of the interrupt to the host. In the preferred embodiment, N=1, so that there is a single interrupt the first time the buffer 208 is emptied during one burst mode, but the host refills the buffer 208 many times thereafter during that same burst mode. This behavior by the host, stimulated by the data pacing of the invention, enhances the data transfer rate, a significant advantage.

Once the character count finally reaches the value stored in the pacing burst count register 248 (YES branch of 304), the Tx Transfer Controller 240 enters wait mode (Block 310). In wait mode the controller 240 refrains from asserting the UART Tx Buffer read signal 242 and the UDIF Tx Buffer write signal 244. Also, at this point, the controller 240 begins a new character count based upon elapsed time (in DSP clock cycles) rather than the number of characters transferred (as no data is transferred across the interface during wait mode).

While in wait mode, with each new count the Tx Transfer Controller 240 determines once each character time if the character count is equal to the value stored in the pacing wait count register 250 (Block 312). If the character count is not equal to the pacing wait count (NO branch of Block 312), the controller 240 remains in wait mode (Block 310). If the character count is equal to the pacing wait count (YES branch of Block 312), the controller 240 returns to a step in which it checks the UART Tx Buffer 208 for available data (Block 300).

2. Receive Channel

Figure 4:
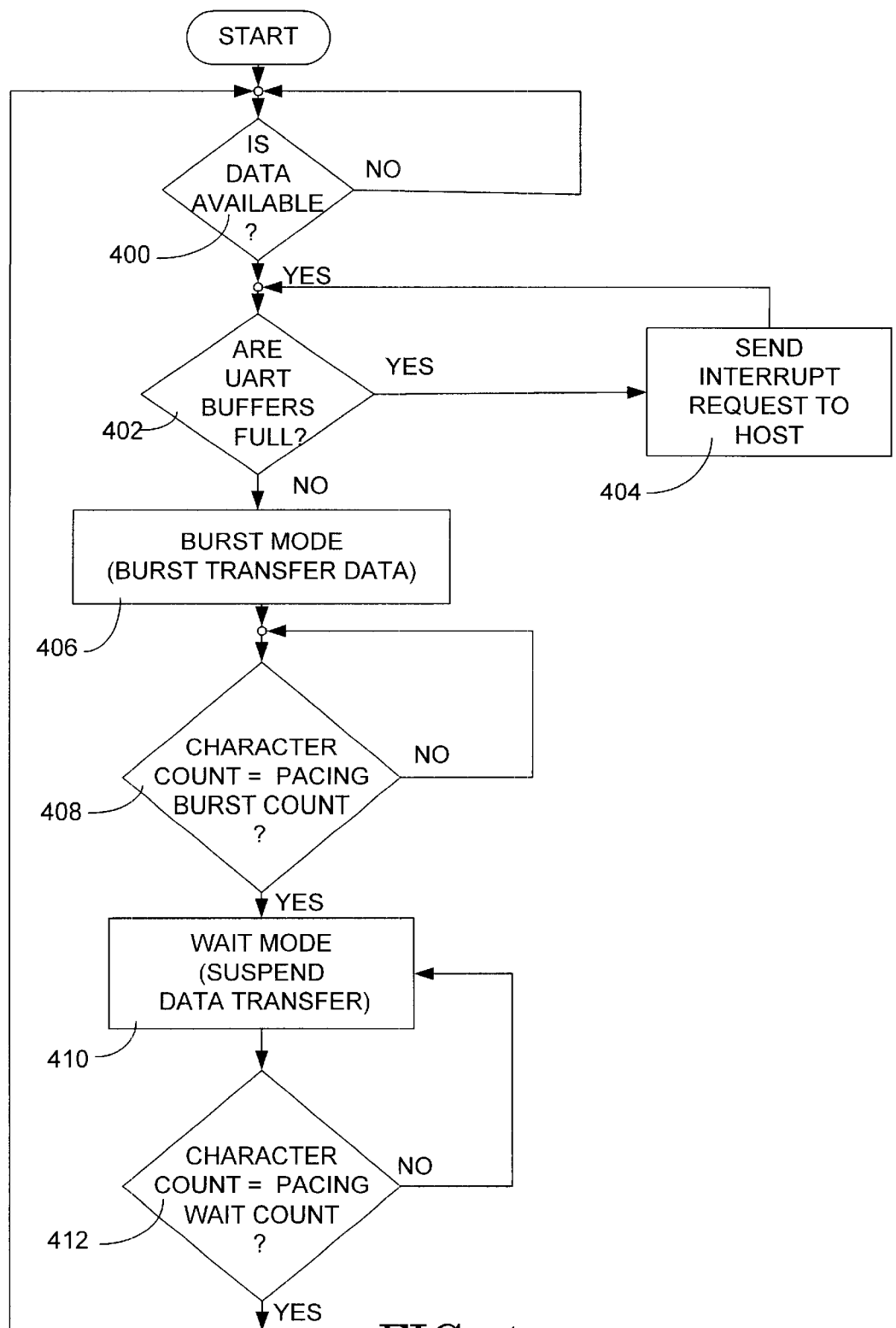
FIG. 4 is a functional diagram illustrating the operation of a receive channel of the present invention.

FIG. 4 shows a receive process implemented by the Rx Transfer Controller 220 of FIG. 2A for the implementation of data pacing in the receive channel. The design of the Rx Transfer Controller 220 is achieved using conventional logic design techniques well known in the art, so as to enable the controller to carry out the process of FIG. 4.

The DSP bus 200 receives data from the remote computer 160 and deposits this data in the UDIF Rx Buffer 202. In Block 400 of FIG. 4, the Rx Transfer Controller 220 determines whether there is data available in the UDIF Rx Buffer 202.

If there is no data available, the Rx Transfer Controller 220 continues to wait for data to become available (NO branch of Block 400). If data is available for transfer to the host in the UDIF Rx Buffer 202 (YES branch of Block 400), the Rx Transfer Controller 220 determines if the UART Rx Buffer 204 is full (Block 402).

If the UART Rx Buffer 204 is full or, alternatively, partially full (YES branch of Block 402), the Rx Transfer Controller 220 sends an interrupt to the host to service this buffer (Block 404). After the interrupt is asserted, the Rx Transfer Controller 220 again determines if the UART Rx Buffer 204 is full. This single interrupt is held until the host responds by beginning to empty the UART Rx buffer 204.

Once the host responds to the interrupt and begins emptying the UART Rx Buffer 204, the UART Rx Buffer 204 is no longer full (NO branch of block 402), and the Rx Transfer Controller 220 goes into burst mode (Block 406). In burst mode, the Rx Transfer Controller 220 enables a read signal 222 in the UDIF Rx Buffer 202 and a write signal 224 to the UART Rx Buffer 204, and begins a character count of the number of data characters actually transferred across the interface. Data is read from the UDIF Rx Buffer 202 and written to the UART Rx Buffer 204.

During burst mode, the host will empty the UART Rx buffer 204 many times. The UART Rx buffer 204 is of the conventional type which has associated with it an external register 204a containing a status field which indicates whether the buffer 204 contains data. This external register is accessed by the host via the host bus 252. Typically, the host computer is conventionally programmed to monitor the status field of the register 204a and to empty the buffer 204 whenever the status field indicates the buffer contains data. As a result, the host empties the buffer 204 many times following the single assertion of the interrupt to the host at the beginning of burst mode. This behavior by host, stimulated by the data pacing of the invention, enhances the data transfer rate, a significant advantage.

While in burst mode, the Rx Transfer Controller 220 counts the number of characters actually transferred across the interface, and compares this character count with the value stored in the pacing burst count register 228 (Block 408). If the character count is not equal to the pacing burst count (NO branch of Block 408), the Rx Transfer Controller 220 remains in burst mode. When the character count is equal to the pacing burst count (YES branch of Block 408), the Rx Transfer Controller 220 enters wait mode (Block 410).

In wait mode, the Rx Transfer Controller 220 refrains from asserting the read signal 222 to the UDIF Rx Buffer 202 and the write signal to the UART Rx Buffer 204, and begins a new character count based upon elapsed time (in DSP clock cycles) rather than the number of characters transferred, since no data is transferred during wait mode. While in wait mode, the Rx Transfer Controller 220 determines once each character count that whether the latest character count is equal to the value stored in the pacing wait count register 230 (Block 412). If the character count is not equal to the pacing wait count (NO branch of Block 412), the Rx Transfer Controller 220 remains in wait mode. When the character count is equal to the pacing wait count (YES branch of Block 412), the Rx Transfer Controller 220 returns to Block 400 to determine if there is data available in the UDIF Rx Buffer 202.

While the invention has been described in detail with reference to its implementation in a modem, the data pacing protocol of the invention is useful for realizing the above-described advantages in any other similar digital communication device having, for example, a UART interface.

While the invention has been described in detail by specific reference to preferred embodiments, it is understood that variations and modification thereof may be made without departing from the true spirit and scope of the invention.

What is claimed is:

1. In a digital communication device with a parallel interface connectable to a host bus of a host computer and a DSP bus connected to a DSP of the modem, a receive channel including a receive write buffer connected to the DSP bus and a receive read buffer connected to the parallel interface, a transmit channel including a transmit read buffer connected to the DSP bus and a transmit write buffer connected to the parallel interface, a method of pacing data transfer comprising:

in the transmit channel:

entering a burst mode by enabling the transmit write buffer to write data to the transmit read buffer while enabling the transmit read buffer to read data from the transmit write buffer for a period of time corresponding to a first burst duration; and upon the expiration of the first burst duration, entering a first wait mode by inhibiting the transmit read and write buffers from reading and writing, respectively, for a first predetermined period of time corresponding to a first wait duration, wherein the first predetermined period of time is determined in accordance with a first predetermined value stored in a first pacing wait register.

2. The method of claim 1 further comprising:

during the first burst duration, permitting a limited number N of interrupts to be asserted to the host computer;

during the first wait duration, inhibiting interrupts to the host computer.

3. The method of claim 2 further comprising:

during the first burst duration, inhibiting interrupts to the host computer after the assertion of N interrupts.

4. The method of claim 2 wherein N=1.

5. The method of claim 1 wherein the step of entering the burst mode is preceded by determining whether data is available in the transmit write buffer, wherein the step of entering the burst mode is postponed until data is available in the transmit write buffer.

6. The method of claim 1 wherein the step of determining whether data is available from the transmit write buffer is performed after the expiration of the first wait duration.

7. The method of claim 1 further comprising:

in the receive channel:

entering a burst mode by enabling the receive write buffer to write data to the receive read buffer while enabling the receive read buffer to read data for a period of time corresponding to a second burst duration; and upon the expiration of the second burst duration, entering a second wait mode by inhibiting the receive read and write buffers from reading and writing, respectively, for a second predetermined period of time corresponding to a second wait duration, wherein the second predetermined period of time is determined in accordance with a second predetermined value stored in a second pacing wait register.

8. The method of claim 7 wherein, in the receive channel, the step of entering a burst mode is preceded by:

waiting until the receive read buffer contents exceeds a threshold and then asserting an interrupt to the host computer.

9. The method of claim 8 wherein, in the receive channel, the step of waiting is followed by a step of waiting until at least some data from the receive read buffer has been removed before performing the step of entering a burst mode.

10. The method of claim 9 further comprising waiting until data is available from the receive write buffer before performing the step of asserting an interrupt to the host.

11. In a digital communication device with a parallel interface connectable to a host bus of a host computer and a DSP bus connected to a DSP of the modem, a receive channel including a receive write buffer connected to the DSP bus and a receive read buffer connected to the parallel interface, a transmit channel including a transmit read buffer connected to the DSP bus and a transmit write buffer connected to the parallel interface, a method of pacing data transfer comprising:

in the receive channel:

entering a burst mode by enabling the receive write buffer to write data to the receive read buffer while enabling the receive read buffer to read data from the receive write buffer for a period of time corresponding to a burst duration; and upon the expiration of the burst duration, entering a wait mode by inhibiting the receive read and write buffers from reading and writing, respectively, for a predetermined period of time corresponding to a wait duration, wherein the predetermined period of time is determined in accordance with a predetermined value stored in a pacing wait register.

12. The method of claim 11 wherein, in the receive channel, the step of entering a burst mode is preceded by:

waiting until the receive read buffer contents exceeds a threshold and then asserting an interrupt to the host computer.

13. The method of claim 12 wherein, in the receive channel, the step of waiting is followed by a step of waiting until at least some data from the receive read buffer has been removed before performing the step of entering a burst mode.

14. The method of claim 13 further comprising waiting until data is available from the receive write buffer before performing the step of asserting an interrupt to the host.

15. In a digital communication device with a parallel interface connectable to a host bus of a host computer and a DSP bus connected to a DSP of the modem, a receive channel including a receive write buffer connected to the DSP bus and a receive read buffer connected to the parallel interface, said receive read and write buffers being connected together, a transmit channel including a transmit read buffer connected to the DSP bus and a transmit write buffer connected to the parallel interface, said transmit read and write buffers being connected together, data transfer pacing circuitry comprising:

a receive data transfer controller having a read signal output connected to said receive read buffer and a write signal output connected to said receive write buffer, said receive data transfer controller asserting said read and write signal outputs during a burst mode of a first duration and refraining from asserting said read and write signal outputs during a wait mode of a second duration; and a transmit data transfer controller having a transmit read signal output connected to said transmit read buffer and a transmit write signal output connected to said transmit write buffer, said transmit data transfer controller asserting said transmit read and write signal outputs during a burst mode of a third duration and refraining from asserting said transmit read and write signal outputs during a wait mode of a fourth duration.

16. The apparatus of claim 15 wherein said first and third durations are the same and said second and fourth durations are the same.

* * * * *